(12) United States Patent
Wolf

(10) Patent No.: US 10,330,103 B2
(45) Date of Patent: Jun. 25, 2019

(54) CENTRIFUGAL BLOWER

(71) Applicant: Mahle International GmbH, Stuttgart (DE)

(72) Inventor: Walter Wolf, Oppenweiler-Zell (DE)

(73) Assignee: Mahle International GmbH (DE)

( * ) Notice: Subject to any disclaimer, the term of this patent is extended or adjusted under 35 U.S.C. 154(b) by 222 days.

(21) Appl. No.: 15/178,086

(22) Filed: Jun. 9, 2016

(65) Prior Publication Data

US 2016/0363126 A1 Dec. 15, 2016

(30) Foreign Application Priority Data

Jun. 10, 2015 (DE) .................. 10 2015 210 647

(51) Int. Cl.
*B60H 1/24* (2006.01)
*F04D 17/16* (2006.01)
(Continued)

(52) U.S. Cl.
CPC ........... *F04D 25/0606* (2013.01); *B60H 1/24* (2013.01); *F04D 17/16* (2013.01); *F04D 25/08* (2013.01); *F04D 29/282* (2013.01); *F04D 29/4233* (2013.01); *F04D 29/706* (2013.01); *F05D 2260/602* (2013.01)

(58) Field of Classification Search
CPC ... B60H 1/24; B60H 1/3233; F05D 2260/602; F04D 17/16; F04D 25/0606; F04D 25/08; F04D 29/282; F04D 29/4233; F04D 29/706
See application file for complete search history.

(56) References Cited

U.S. PATENT DOCUMENTS 5,711,368 A 1/1998 Ito et al.
6,552,457 B2 4/2003 Uruma et al.
(Continued)

FOREIGN PATENT DOCUMENTS

DE 19627018 A1 1/1997
DE 10115038 A1 1/2002
(Continued)

OTHER PUBLICATIONS

English abstract for DE-102010027377.
German search report for DE-102015210641.0, dated Jan. 21, 2016.

*Primary Examiner* — Philip E Stimpert
(74) *Attorney, Agent, or Firm* — Fishman Stewart PLLC

(57) ABSTRACT

A centrifugal blower for an air conditioning system in a motor vehicle may include a centrifugal fan with an electric motor, which may drive a fan wheel in rotation. The centrifugal blower may also include a motor bracket for the electric motor, which may receive the centrifugal fan internally and may have a collar extending outward in a radial direction. An encircling water protection ring may be arranged internally on the collar, the water protection ring extending upward in an axial direction. The motor bracket may be configured as a hollow part with an interior annular water collection channel arranged beneath the collar, and may have a floor tilted radially outward. The at least one opening may be disposed at a transition from the collar to the water protection ring, by which water may drain into the water collection channel. The water collection channel may include at least one drain.

20 Claims, 4 Drawing Sheets

(51) Int. Cl.
    *F04D 25/06*     (2006.01)
    *F04D 25/08*     (2006.01)
    *F04D 29/28*     (2006.01)
    *F04D 29/42*     (2006.01)
    *F04D 29/70*     (2006.01)

(56) References Cited

U.S. PATENT DOCUMENTS

| | | |
|---|---|---|
| 7,067,946 B2 | 6/2006 | Noda et al. |
| 2002/0011325 A1 | 1/2002 | Shikata et al. |
| 2005/0180867 A1* | 8/2005 | Takahashi ............... F04D 25/08 417/423.14 |
| 2010/0166580 A1* | 7/2010 | Lan .......................... F04D 25/08 417/423.14 |
| 2011/0189033 A1 | 8/2011 | Czulak et al. |
| 2013/0336819 A1* | 12/2013 | Kobayashi .......... F04D 29/4226 417/410.1 |

FOREIGN PATENT DOCUMENTS

| | | |
|---|---|---|
| DE | 10134164 A1 | 1/2002 |
| DE | 102004030814 A1 | 2/2005 |
| DE | 102010027377 A1 | 3/2011 |
| DE | 112012002419 T5 | 3/2014 |

* cited by examiner

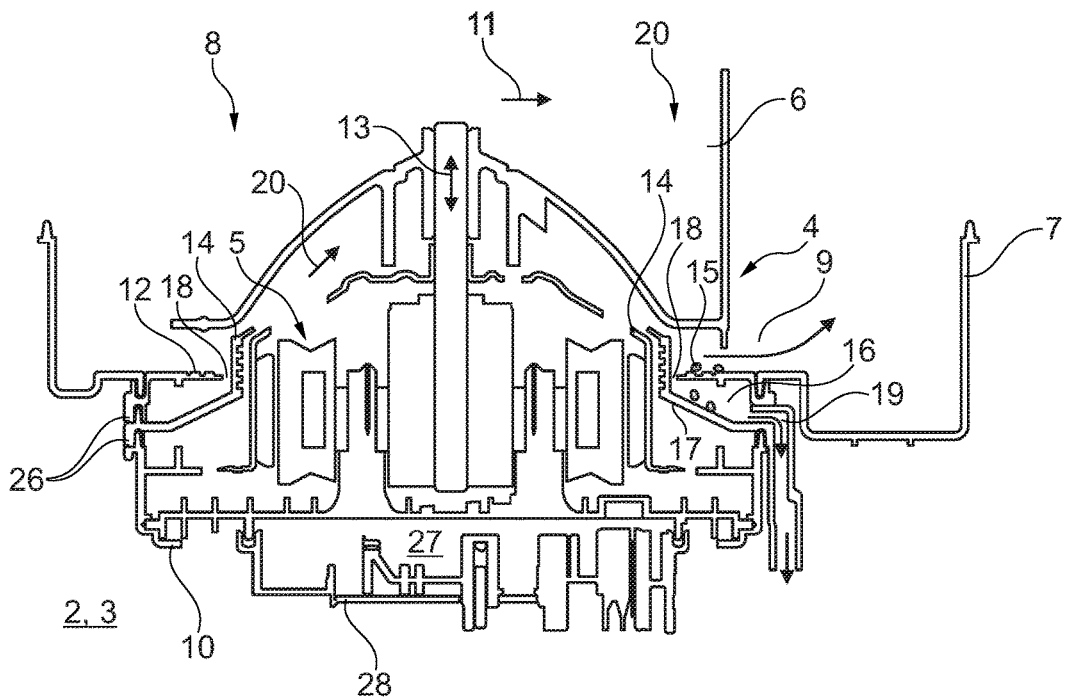
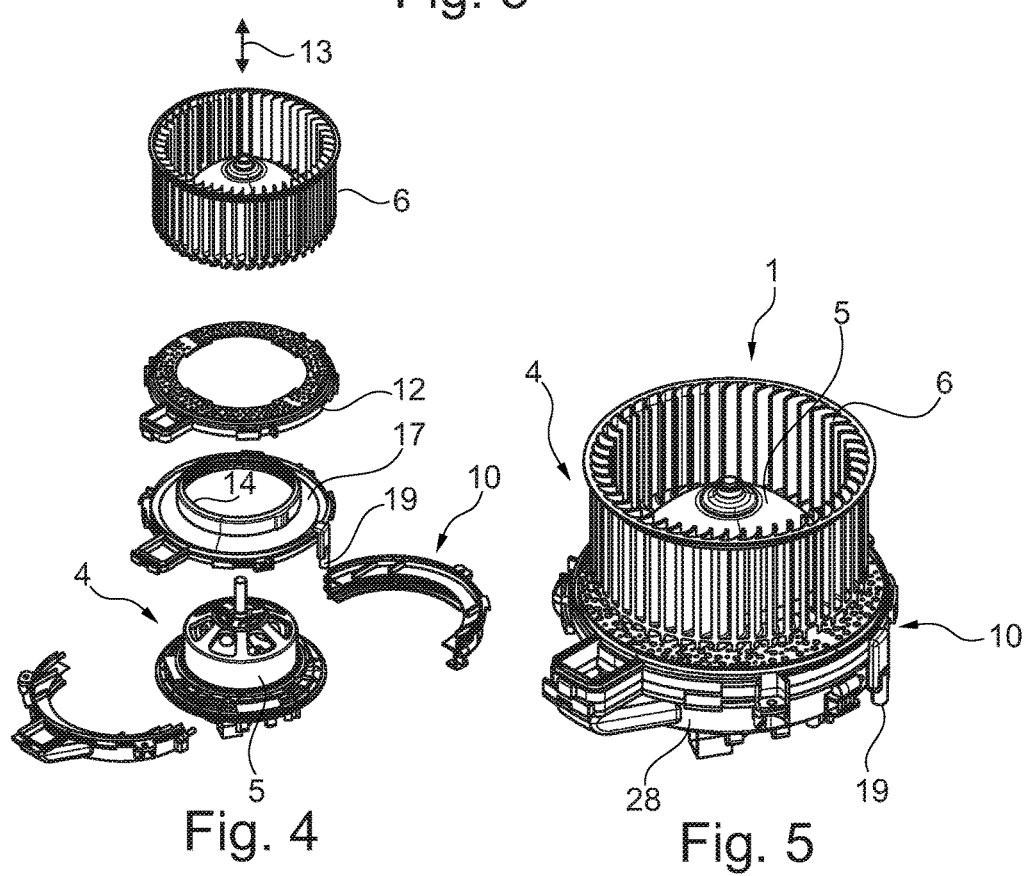
Fig. 3
Fig. 4
Fig. 5

CENTRIFUGAL BLOWER

CROSS-REFERENCE TO RELATED APPLICATIONS

This application claims priority to German Patent Application No. 10 2015 210 647.0, filed Jun. 10, 2015, the contents of which are hereby incorporated by reference in their entirety.

TECHNICAL FIELD

The present invention concerns a centrifugal blower for an air conditioning system in a motor vehicle. The invention furthermore concerns an air conditioning system of a motor vehicle with such a centrifugal blower as well as a motor vehicle with such an air conditioning system.

BACKGROUND

From DE 11 2012 002 419 T5 there is known a centrifugal blower of an air conditioning system in a motor vehicle of this kind, with a centrifugal fan, having an electric motor as well as a fan wheel coupled to it firmly against twisting. The centrifugal blower furthermore has a fan housing with an air inlet and an air outlet, which at the same time receives the centrifugal fan inside it. The electric motor of the centrifugal blower is fixed in a motor bracket, having a cylindrical shape and possessing a collar extending outward in the radial direction, on which a circumferential water protection ring is arranged, situated radially inward and extending upwardly in the axial direction. This water protection ring is supposed to prevent a penetration of water into the motor.

From DE 10 2010 027 377 A1 there is known another centrifugal blower for an air conditioning system in a motor vehicle with a housing and with an impeller, whose vanes are coupled to a hub of the impeller via a carrier. The carrier is impermeable to water droplets in the axial direction of the impeller and extends in the radial direction beyond the respective outer edges of the vanes of the impeller. Furthermore, a water retention wall disposed on the housing, with the carrier extending beyond it, ensures that water droplets taken in cannot get to a drive motor of the impeller.

In general, the water separation process in motor vehicles is getting functionally worse on account of increasing cost pressure and steadily diminishing available design space, so that more and more water is getting into an air conditioning system with the fresh air taken in across an end wall. Filters, especially filters installed at the factory, already reduce the water fraction substantially, but do not entirely prevent water droplets from getting into the motor and causing damage there, at least in the long term.

Furthermore, for the cooling of the motor of a centrifugal blower the cooling air is taken in downstream from the filter, so as to take clean, dry air through the blower motor. This cooling air flows through an annular gap and is separated once more in a region beneath the motor. Even so, water can also collect in this case underneath a fan wheel and get into the motor region in an unwanted manner. For example, this can occur or be intensified in violent rainstorms or also in car washing facilities due to penetration of a water surge, especially if drains on the vehicle are plugged up.

SUMMARY

The present invention therefore deals with the problem of indicating for a centrifugal blower of the mentioned kind an improved or at least an alternative design, which is distinguished in particular by a protection of a motor of the centrifugal blower against penetrating water.

This problem is solved according to the invention by the subject matter of the independent claims. Advantageous embodiments are the subject matter of the dependent claims.

The present invention is based on the general notion of providing a water collection channel in a motor bracket for an electric motor of a centrifugal blower, by which water droplets separated from the cooling air taken in can be collected and reliably taken away, without the danger of these water droplets getting into the electric motor. The water collection channel according to the invention is arranged in the interior and underneath a plane of a collar of the motor bracket and bounded off from individual components of the motor bracket, so that the manufacturing of the motor bracket with collar and integrated water collection channel is possible by a simple modification of a plastic injection moulding die and is thus relatively economical. The centrifugal blower according to the invention is installed in an air conditioning system in a motor vehicle and has a centrifugal fan with the above-described electric motor and a fan wheel coupled to it firmly against twisting. Furthermore, there is provided the motor bracket, which receives the centrifugal fan internally and has the collar extending radially outward, on which is arranged internally an encircling water protection ring extending upward in the operating state. This water protection ring, which is configured as an annular water protection wall, is supposed to prevent water separated at the collar from being drawn inward and thus into the motor by the prevailing air flow. According to the invention, now, the motor bracket is configured as a hollow part with an interior annular water collection channel arranged beneath the collar, having a floor which is tilted radially outward. In order to reliably direct the water deposited on the collar or the water droplets deposited there into the water collection channel, at least one opening is disposed at the transition from the collar to the water protection ring, by which the water can drain into the water collection channel arranged underneath. The water collection channel, in turn, has at least one drain, by which the water collected therein can be drained, and this drain depending on the design can be connected in different ways in its later course. Thus, with the motor bracket according to the invention it is possible to reliably collect the water deposited on its collar and drain it collectively, without the danger of this water getting into the motor supported by the motor bracket and possibly causing damage there. It has been the case thus far with the centrifugal fans known in the prior art that as soon as enough water collected on the collar it would be drawn inward by virtue of the air flow prevailing there and initiated by the fan wheel of the centrifugal fan and across the vertically upward extending water protection ring. Such a danger existed in particular when a lot of water accumulated in a short time, such as in a car wash or during heavy rain. With the motor bracket according to the invention and thus also with the centrifugal blower according to the invention, however, even such extreme situations can be handled with no problem, since even when a large and heavy volume of water accumulates it can be drained through the at least one opening in the transitional region of the collar to the water ring into the water collection channel disposed underneath and from here taken away via a drain. The providing of such a water collection channel and the corresponding openings and the at least one drain can be accomplished by a simple modification of the plastic injection moulding die used to make the motor bracket, so that the added value achieved can be obtained by only a marginal increase in costs.

Expediently, the spiral housing has a spiral flow channel with a tongue, wherein the drain is disposed in the region of the tongue of the spiral housing. With such a design, the high flow velocity occurring in the region of the tongue can be utilized to aspirate the water collected in the water collection channel and eject it via the cooling air outlet. In order to intensify the effect, the drain could also be connected by a jet suction pump to the flow channel, especially in the region of the tongue, but also in any other site. Thanks to the high velocity of the flowing air prevailing in the flow channel, it is easily possible to operate the jet suction pump and thereby drain the water collection channel. Alternatively to the jet suction pump or as a special modification thereof, a Lenz device could of course also be provided, such as a Lenz flap, or a Venturi nozzle to atomize the drained water. In order to intensify the partial vacuum producing the action of the Lenz device or the jet suction pump, baffle elements could of course also be provided in the region of the flow channel of the spiral housing, such as ribs, which increase the flow velocity at the outlet of the jet suction pump/Lenz device. The ribs should be configured such that they are easy to demould from a plastic injection moulding die, in particular without any further gates. Alternatively, of course, it is also conceivable for the water collection channel with its drain to be coupled to a water drainage hose, which uses gravity to drain away the water separated and building up in the water collection channel to the surroundings. Again alternatively it is also conceivable to connect the drain to a water drain or outlet located in the distributor housing. In the distributor housing, the water of condensation building up at the evaporator is drained away. Another option is to connect the drain of the water collection channel to a region of the filter lid or the filter receptacle. The water is either taken up from the filter or delivered via the air pathway to the evaporator. In many newer HVACs the filter lid has a drainage, so that the water can then be taken away safely through the filter drainage without requiring any additional infrastructure measures.

In another advantageous embodiment of the solution according to the invention, the motor bracket is configured as a multiple-piece, especially a two, three, four or six-piece, injection moulded plastic part. Thanks to a multiple-piece design of the motor bracket, an especially easy integration of the water collection channel in the motor bracket is possible, after which the motor bracket itself is easily put together.

Expediently, the at least one opening is configured as a ring segment slot, extending along the transition from the collar to the water protection ring. Of course, it is also conceivable to provide several such ring segment slots, by which an almost completely encircling drainage opening can be created.

At least one such slot must be provided, and when there are several slots these can be distributed evenly or unevenly about the periphery. In this way, a reliable drainage of the collar in a uniform manner about the periphery and discharge of the collected water is possible into the water collection channel disposed underneath, in the second plane.

The present invention is moreover based on the general notion of using the above described centrifugal blower in an air conditioning system of a motor vehicle, in which installation it is able in particular to reliably drain away a large water volume occurring in a short time. Such high water volume is assumed to occur in particular during heavy rain or at car washes.

Further important features and benefits of the invention will emerge from the dependent claims, from the drawings and from the corresponding description of figures with the aid of the drawings.

Of course, the above mentioned and yet to be explained features can be used not only in the particular indicated combination, but also in other combinations or standing alone, without leaving the scope of the present invention.

Preferred sample embodiments of the invention are represented in the drawings and shall be explained more closely in the following description, the same reference numbers pertaining to the same or similar or functionally identical parts.

BRIEF DESCRIPTION OF THE DRAWINGS

The figures show, each time schematically.

DETAILED DESCRIPTION

Figure 1:
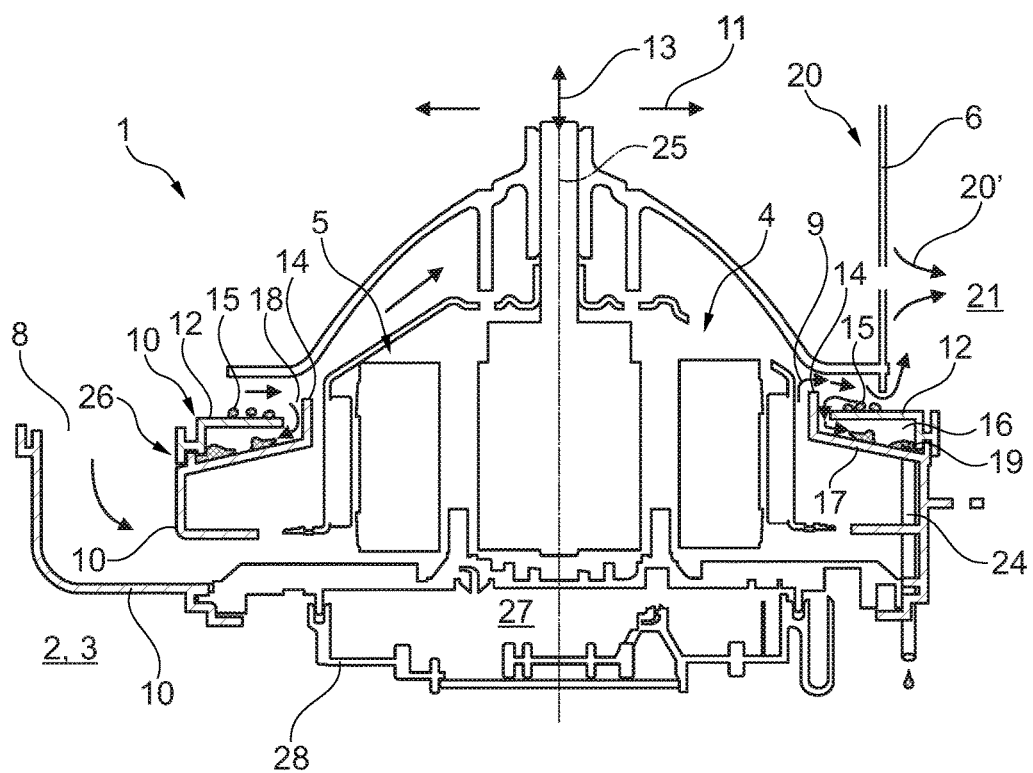
FIG. 1 a sectional representation through a centrifugal blower of an air conditioning system in a motor vehicle according to the invention, FIG. 2 another sectional representation through the centrifugal blower according to the invention, but in a different sectioning plane, FIG. 3 a sectional representation as in FIG. 1, but slightly modified, FIG. 4 an exploded representation of the centrifugal blower represented in FIG. 3, FIG. 5 a representation like FIG. 4, but in the assembled state, FIG. 6 a representation like in FIG. 5, but with a drain for a jet suction pump, a Lenz device or a nozzle, FIG. 7 a centrifugal blower according to FIG. 6 in the installed state, FIG. 8 a centrifugal blower with a jet suction pump with a Venturi geometry.

According to FIGS. 1 to 8, a centrifugal blower 1 of an air conditioning system 2 in a motor vehicle 3 according to the invention (also see FIG. 2) has a centrifugal fan 4 with an electric motor 5, which drives in rotation a fan wheel 6, only partially drawn. Likewise, there is provided a spiral housing 7 with a cooling air inlet 8 and a cooling air outlet 9, which receives the centrifugal fan 4 internally. The electric motor 5 is supported in a motor bracket 10, having a collar 12 extending outward in the radial direction 11, on which is arranged internally an encircling water protection ring 14 extending upward in the axial direction 13. The water protection ring 14 is fashioned as a kind of annular water protection wall or water protection barrier, which is meant to reliably prevent a penetration of water droplets 15 or water film building up on the collar 12 into the electric motor 5. According to the invention, now, the motor bracket 10 is fashioned as a hollow part with an interior annular water collection channel 16 arranged underneath the collar 12, having a floor 17 tilted radially outward. The motor bracket 10 can also be configured as two half-shells, as is shown in FIG. 4, in order to facilitate the installation of the motor 5 in particular.

At the transition from the collar 12 to the water protection ring 14 there is disposed at least one, preferably several openings 18, by which water 15 can drain into the water collection channel 16 arranged underneath. The water collection channel 16 furthermore has at its lowest point at least one drain 19 (see FIG. 2), by which the water 15 collected in the water collection channel 16 can be drained away. The openings 18 downward into the water collection channel 16 are located preferably directly at the foot of the water protection ring 14, since most of the water 15 collects here on account of the complex flow and pressure conditions. Depending on the kind of water (water with surfactants in the case of cleaning jobs, car washes, or contamination with windscreen wiper fluid, or "hard water without surfactants" during heavy downpours or lengthy rain), either a film will form on the collar 12 or a wedge-shaped ring of water along the water protection ring 14. These effects are heavily dependent inter alia on the operating state of the HVAC (operating mode, temperature settings, rpm, etc.). Of course, one or more openings 18 can be arranged on the collar surface.

It is thus possible with the centrifugal blower 1 according to the invention to reliably drain away the water contained in the air flow 20 taken in and deposited on the collar 12 via the water collection channel 16 before it builds up in such an amount on the collar 12 that it is delivered by virtue of the air flow 20 across the water protection ring 14 and then gets into the motor 5, where it can cause damage. The air flow 20 according to FIG. 1 is taken in from above and mixes with the cooling air aspirated from the cooling air outlet 9 to form a mixed air flow 20', which is then ejected.

Figure 2:
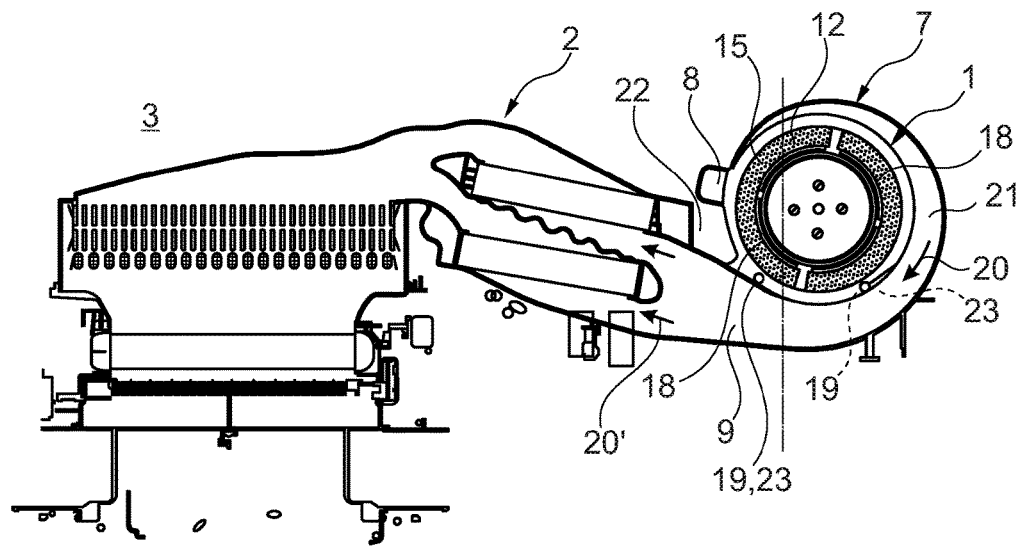
Figure 7:
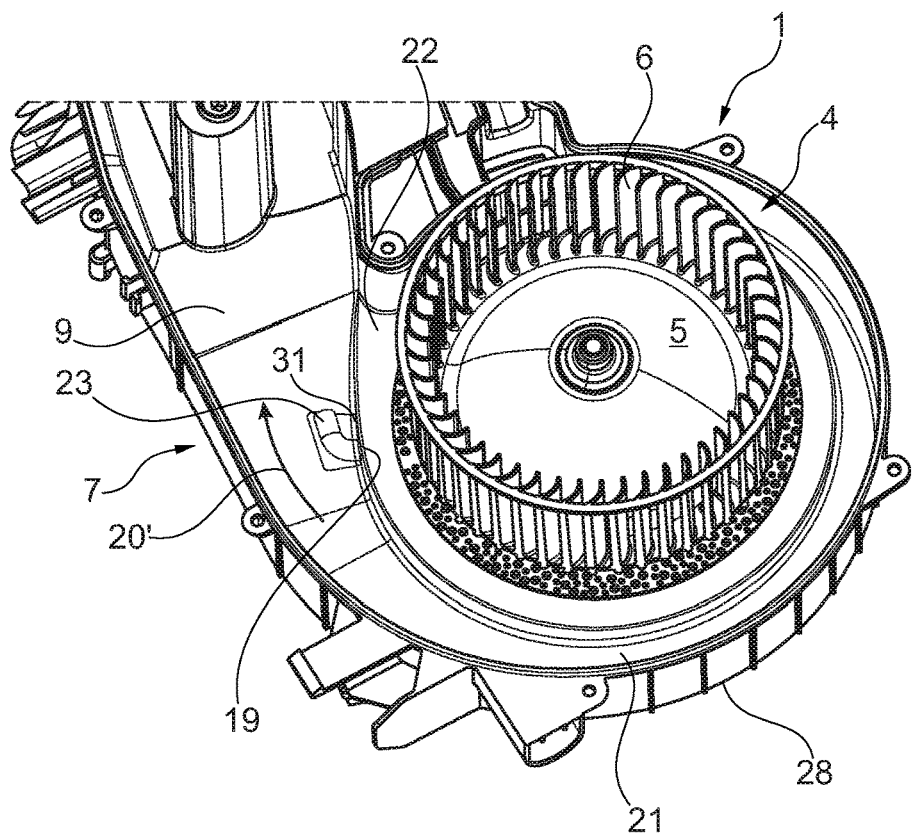
Figure 8:
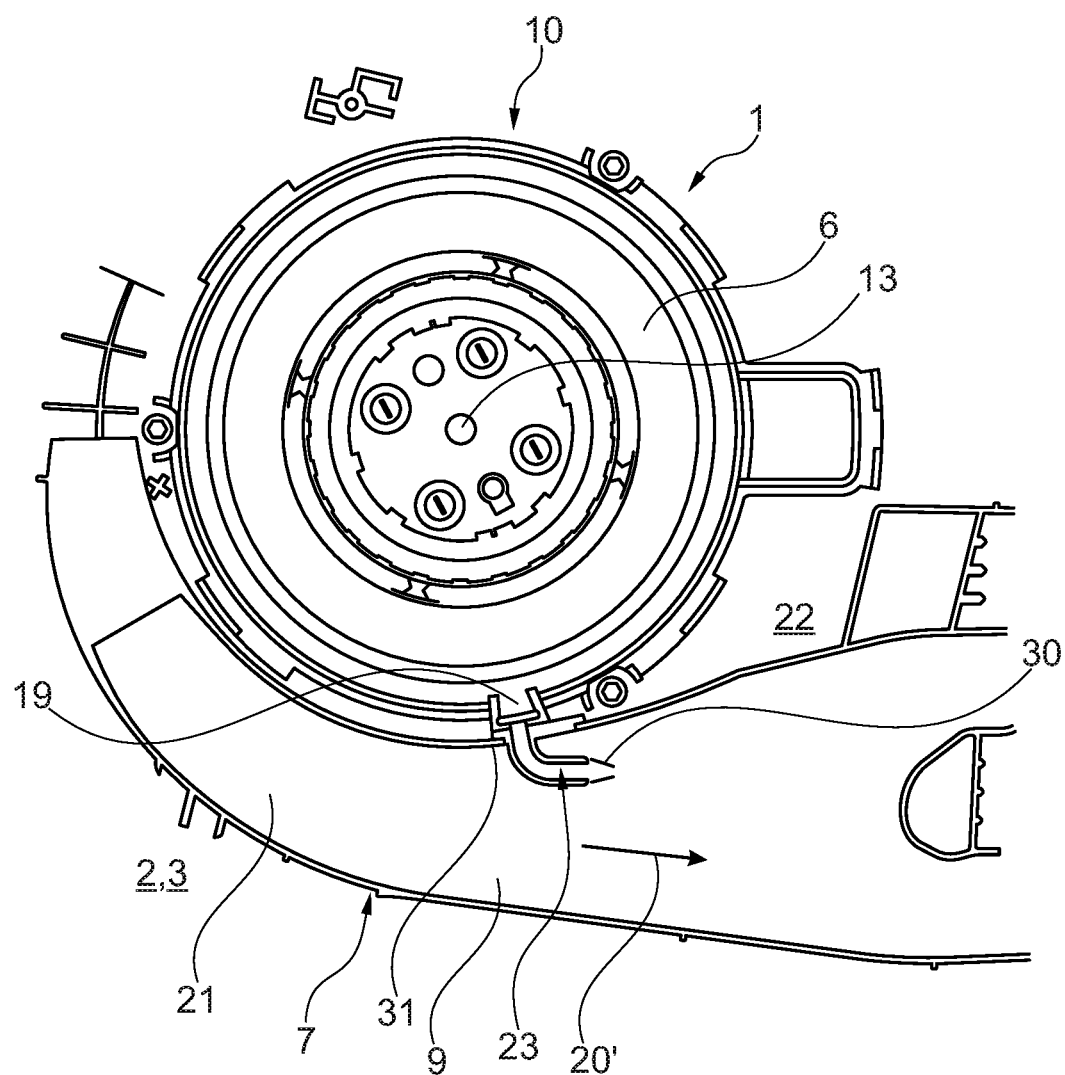

If one considers FIGS. 2, 7 and 8, it will be noticed that the spiral housing 7 has a spiral flow channel 21 with a tongue 22. The drain 19 can be arranged preferably in the region of the tongue 22 of the spiral housing 7, because in this region the air flow created by the fan wheel 6 has a relatively high velocity and therefore the water built up in the water collection channel 16 will be swept via the drain 19 into the flow channel 21. In this case, the drain 19 itself can be designed as a kind of jet suction pump 23 and be connected to the flow channel 21, while of course the arrangement of the drain 19 is also conceivable in any other desired place, in which case the drain 19 can likewise be connected by a jet suction pump 23 to the flow channel 21. This is indicated in FIG. 2 by a broken line and should only be viewed as another possible embodiment. The position of the drain 19 in the region of the tongue 22 has benefits, especially for a spiral housing 7 with axial broadening, since when the blower shaft is oriented vertically this will be the lowest point in normal position.

Figure 6:
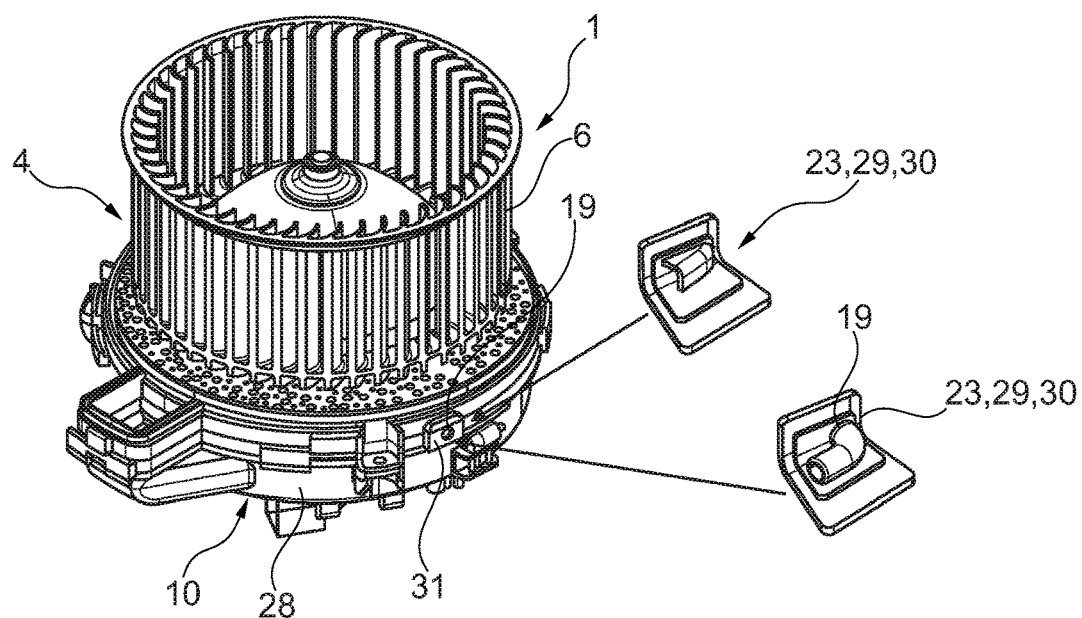

Alternatively to the jet suction pump 23 or as a special design thereof, one could of course also provide a Lenz device 29, such as a Lenz flap, or a Venturi nozzle 30, for example, for the atomizing of the drained water (see FIGS. 6 to 8). In order to intensify the partial vacuum generating the effect of the Lenz device 29 or the jet suction pump 23, baffle elements (not shown) can of course also be provided in the region of the flow channel 21 of the spiral housing 7, such as ribs, for example, which increase the flow velocity at the outlet of the jet suction pump 23/Lenz device 29. The ribs should be designed such that they are easily demoulded from a plastic injection moulding die, in particular with no further gates.

If one considers FIG. 6, it will be noticed that a receptacle 31 is provided on the motor bracket 10, which contains the drain 19 and in which a Venturi nozzle 30, a Lenz device 29 or a jet suction pump 23 can be installed. The attachment can be by welding, clipping or gluing. In FIG. 8 the Venturi nozzle 30 shows additional flow guiding elements.

Alternatively, of course, it is also conceivable to couple the drain 19 to a drain hose 24, by which the water 15 collected in the water collection channel 16 can be taken away to the surroundings.

If one considers FIG. 1 it can be noticed that an axis 25 of the motor 5 is vertically oriented in the operating state, as is the water protection ring 14. Of course, it is also conceivable for the axis 25 of the motor to be oriented away from the vertical, and even a horizontal orientation is conceivable, for example. The motor bracket 10 is preferably configured as a multi-piece, especially a two, three, four or six-piece, injection moulded plastic part and in this way it is relatively easy and economical to produce, since the water collection channel 16 is easy to integrate in it. Of course, it is also conceivable to configure the collar 12 as a separate part and later on connect it to a part of the motor bracket 10, especially by a tongue and groove connection 26 (see FIGS. 1 and 3), for example by gluing or clipping.

Beneath the motor 5 there is arranged a control electronics 27 in an encapsulated housing 28, the control electronics 27 being used for power control of the centrifugal fan 4. Thanks to the encapsulated housing 28, the control electronics 27 is in a protected arrangement. If one looks more closely at FIG. 2 it can be noticed that the openings 18 are formed as ring segment slots, which extend along the transition from the collar 12 to the water protection ring 14. A total of four ring segment openings 18 are drawn here, while of course it is clear that an embodiment with at least one such opening 18 is also adequate. By providing, for example, an opening 18 forming an almost closed ring, however, the water drainage can be organized reliably. Optionally, the openings 18 can also be positioned only at one or more critical locations. In the case of at least one opening 18, this will be preferably positioned in the broadened tongue region.

The centrifugal blower 1 according to the invention is used in an air conditioning system 2 of a motor vehicle, where it helps in particular to reliably drain away large amounts of water occurring in a short time frame through the water collection channel 16, without it getting into the motor 5 and causing damage there in the short or long term. The integration of the water collection channel 16 according to the invention can be done at favourable cost.

The invention claimed is:

1. A centrifugal blower for an air conditioning system in a motor vehicle comprising:
    a centrifugal fan with an electric motor, which drives a fan wheel in rotation,
    a motor bracket for the electric motor, which receives the centrifugal fan internally and has a collar extending outward in a radial direction, and
    an encircling water protection ring arranged internally on the motor bracket and extending upward in an axial direction,
    wherein the motor bracket is configured as a hollow part with an interior annular water collection channel arranged beneath the collar, the water collection channel having a floor which is tilted downward in a radially outward direction
    wherein at least one opening is disposed at a transition from the collar to the water protection ring, by which water is able to drain into the water collection channel arranged underneath,
    wherein the water collection channel has at least one drain, and
    wherein the collar at least partially covers the water collection channel.

2. A centrifugal blower according to claim 1, further comprising a spiral housing having a spiral flow channel with a tongue.

3. A centrifugal blower according to claim 2, wherein the at least one drain is disposed in a region of the tongue of the spiral housing.

4. A centrifugal blower according to claim 2, wherein the at least one drain is connected by one of a jet suction pump, a Lenz device, or a Venturi nozzle to the spiral flow channel.

5. A centrifugal blower according to claim 2, wherein an axis of the motor is vertically oriented in an operating state.

6. A centrifugal blower according to claim 2, wherein the motor bracket is configured as a multiple-piece injection moulded plastic part, and the collar is an integrated part of the motor bracket or is configured separate from the motor bracket.

7. A centrifugal blower according to claim 2, further comprising control electronics in an encapsulated housing disposed underneath the motor.

8. A centrifugal blower according to claim 2, wherein the at least one opening is configured as a ring segment slot, which extends along the transition from the collar to the water protection ring.

9. A centrifugal blower according to claim 1, wherein an axis of the motor is vertically oriented in an operating state.

10. A centrifugal blower according to claim 1, wherein the motor bracket is configured as a multiple-piece injection moulded plastic part, and the collar is an integrated part of the motor bracket or is configured separate from the motor bracket.

11. A centrifugal blower according to claim 1, further comprising control electronics in an encapsulated housing disposed underneath the motor.

12. A centrifugal blower according to claim 1, wherein the at least one opening is configured as a ring segment slot, which extends along the transition from the collar to the water protection ring.

13. An air conditioning system of a motor vehicle, comprising a centrifugal blower having:
   a centrifugal fan with an electric motor, which drives a fan wheel in rotation,
   a motor bracket for the electric motor, which receives the centrifugal fan internally and has a collar extending outward in a radial direction, and
   an encircling water protection ring arranged internally on the motor bracket and extending upward in an axial direction,
   wherein the motor bracket is configured as a hollow part with an interior annular water collection channel arranged beneath the collar, the water collection channel having a floor which is tilted downward in a radially outward direction,
   wherein at least one opening is disposed at a transition from the collar to the water protection ring, by which water is able to drain into the water collection channel arranged underneath,
   wherein the water collection channel has at least one drain, and
   wherein the at least one opening is configured as a ring segment slot, which extends circumferentially along the transition from the collar to the water protection ring for a distance greater than a height of the ring segment slot.

14. An air conditioning system according to claim 13, further comprising a spiral housing having a spiral flow channel with a tongue.

15. An air conditioning system according to claim 14, wherein the at least one drain is disposed in a region of the tongue of the spiral housing.

16. An air conditioning system according to claim 14, wherein the at least one drain is connected by one of a jet suction pump, a Lenz device, or a Venturi nozzle to the spiral flow channel.

17. A motor vehicle comprising an air conditioning system including a centrifugal blower having:
   a centrifugal fan with an electric motor, which drives a fan wheel in rotation,
   a motor bracket for the electric motor, which receives the centrifugal fan internally and has a collar extending outward in a radial direction, and
   an encircling water protection ring arranged internally on the motor bracket and extending upward in an axial direction,
   wherein the motor bracket is configured as a hollow part with an interior annular water collection channel arranged beneath the collar, the water collection channel having a floor which is tilted downward in a radially outward direction,
   wherein at least one opening is disposed at a transition from the collar to the water protection ring, by which water is able to drain into the water collection channel arranged underneath,
   wherein the water collection channel has at least one drain, and
   wherein the collar at least partially covers the water collection channel.

18. A motor vehicle according to claim 17, further comprising a spiral housing having a spiral flow channel with a tongue.

19. A motor vehicle according to claim 18, wherein the at least one drain is disposed in a region of the tongue of the spiral housing.

20. A motor vehicle according to claim 18, wherein the at least one drain is connected by one of a jet suction pump, a Lenz device, or a Venturi nozzle to the spiral flow channel.

\* \* \* \* \*